US008028025B2

(12) United States Patent
Kumar et al.

(10) Patent No.: US 8,028,025 B2
(45) Date of Patent: Sep. 27, 2011

(54) APPARATUS, SYSTEM, AND METHOD FOR SETTING/RETRIEVING HEADER INFORMATION DYNAMICALLY INTO/FROM SERVICE DATA OBJECTS FOR PROTOCOL BASED TECHNOLOGY ADAPTERS

(75) Inventors: Rajan Kumar, Tamilnadu (IN); Deepa Rao Koppa V, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 955 days.

(21) Appl. No.: 11/419,171

(22) Filed: May 18, 2006

(65) Prior Publication Data
US 2007/0271341 A1 Nov. 22, 2007

(51) Int. Cl.
*G06F 15/16* (2006.01)
(52) U.S. Cl. ........................................ 709/206
(58) Field of Classification Search .................. 709/206
See application file for complete search history.

(56) References Cited

U.S. PATENT DOCUMENTS

| | | | | |
|---|---|---|---|---|
| 5,794,039 A * | 8/1998 | Guck | ................................. | 1/1 |
| 5,870,548 A * | 2/1999 | Nielsen | ........................ | 709/206 |
| 6,031,895 A | 2/2000 | Cohn et al. | ................. | 379/88.13 |
| 6,167,402 A * | 12/2000 | Yeager | ................................. | 1/1 |
| 6,658,454 B1 * | 12/2003 | Delany et al. | ................. | 709/202 |
| 6,707,472 B1 * | 3/2004 | Grauman | ........................ | 715/752 |
| 6,789,077 B1 * | 9/2004 | Slaughter et al. | ................. | 1/1 |
| 7,668,917 B2 * | 2/2010 | Netsch et al. | ................. | 709/206 |
| 2002/0038340 A1 | 3/2002 | Whipple et al. | ................. | 709/203 |
| 2003/0025927 A1 * | 2/2003 | Hino et al. | ................. | 358/1.13 |
| 2003/0093315 A1 * | 5/2003 | Sato | ................................. | 705/14 |
| 2003/0135567 A1 * | 7/2003 | Reilly | ........................ | 709/206 |
| 2003/0163539 A1 | 8/2003 | Piccinelli | ........................ | 709/206 |
| 2003/0167194 A1 | 9/2003 | Piccinelli | ........................ | 705/7 |
| 2004/0064511 A1 * | 4/2004 | Abdel-Aziz et al. | .......... | 709/206 |
| 2005/0192962 A1 * | 9/2005 | Furrer et al. | ...................... | 707/8 |
| 2005/0198158 A1 * | 9/2005 | Fabre et al. | .................... | 709/206 |
| 2005/0262211 A1 * | 11/2005 | Yamashita | .................... | 709/206 |
| 2005/0267738 A1 * | 12/2005 | Wilkinson et al. | ................ | 704/9 |
| 2005/0273521 A1 * | 12/2005 | Patrick et al. | ................. | 709/246 |
| 2005/0273668 A1 * | 12/2005 | Manning | ......................... | 714/39 |
| 2006/0026467 A1 * | 2/2006 | Nehab et al. | .................... | 714/38 |
| 2006/0047780 A1 * | 3/2006 | Patnude | ......................... | 709/219 |

(Continued)

OTHER PUBLICATIONS

Gavin et al., (Gavin), NPL, IBM, 2003, A B2B Solution using WebSphere Business Integration V4.1 and WebSphere Business Connection V1.1., p. xiii, 56, 57, 110, 146, 20, 49, 48, 92, 59, 69, 11, 313, 271, 36, 299, 236, 300, 3, 13, 53, 54, 27, 15, 231, 362, 393, 422.*

(Continued)

*Primary Examiner* — Firmin Backer
*Assistant Examiner* — James Edwards
(74) *Attorney, Agent, or Firm* — Kunzler Needham Massey & Thorpe

(57) ABSTRACT

An apparatus, system, and method are disclosed for processing a technology specific message. In one embodiment, a computer program product receives a message having a conventional header and a user-defined header that both conform to a predefined header format, each header comprising a header name and a value; identifies each header in the message based on the predefined header format; generates a header structure to store the header name and the value from each header; stores the header structure in a set of header structures of an extendable message business object; and passes the extendable message business object to an integration broker.

35 Claims, 6 Drawing Sheets

U.S. PATENT DOCUMENTS

| | | | | |
|---|---|---|---|---|
| 2006/0056628 | A1* | 3/2006 | Todd | 380/233 |
| 2006/0212593 | A1* | 9/2006 | Patrick et al. | 709/230 |
| 2007/0038719 | A1* | 2/2007 | Brown et al. | 709/207 |
| 2007/0115978 | A1* | 5/2007 | Kondo | 370/392 |
| 2007/0143407 | A1* | 6/2007 | Avritch et al. | 709/206 |
| 2007/0156756 | A1* | 7/2007 | Stoyanova | 707/104.1 |
| 2007/0174398 | A1* | 7/2007 | Addante | 709/206 |

OTHER PUBLICATIONS

Crocker, (Crocker), NPL, RFC #822, Aug. 13, 1982, "Standard For The Format of Arpa Internet Text Messages", p. 2, 5, 25, 45, 30, 29, 39, 19, Appendix A, B, C.*

Gavin et al., (Gavin), NPL, IBM, 2003, A B2B Solution using WebSphere Business Integration V4.1 and WebSphere Business Connection V1.1.*

Crocker, (Crocker), NPL, RFC #822, Aug. 13, 1982, "Standard For The Format of Arpa Internet Text Messages".*

John Beatty et al. *Next-Generation Data Programming: Service Data Objects*. IBM and BEA joint whitepaper. Nov. 2003.

How the Adapter Works. http://publib.boulder.ibm.com/infocenter/wbihelp/v6rxmx/topic/com.ibm.wbia_adapters.doc/doc/email/email19.htm.

Using e-Mail adapter business objects. http://publib.boulder.ibm.com/infocenter/wbihelp/v6rxmx/topic/com.ibm.wbia_adapters.doc/doc/email/email39.htm.

Adapter Components http://publib.boulder.ibm.com/infocenter/wbihelp/v6rxmx/index.jsp?topic=/com.ibm.wbia_adapters.doc/doc/email/email39.htm.

* cited by examiner

APPARATUS, SYSTEM, AND METHOD FOR SETTING/RETRIEVING HEADER INFORMATION DYNAMICALLY INTO/FROM SERVICE DATA OBJECTS FOR PROTOCOL BASED TECHNOLOGY ADAPTERS

BACKGROUND OF THE INVENTION

1. Field of the Invention

This invention relates to service data objects and more particularly relates to setting and retrieving dynamic header information into and from service data objects for protocol based technology adapters.

2. Description of the Related Art

Many corporations depend upon enterprise information systems (EISs) to manage their data and workflow. In some instances, an EIS application integrates a corporate database with day to day work processes. Employees may use one EIS to track inventory levels, shipments, purchases, and sales. Employees may use another EIS to track personnel related information.

As corporations acquire multiple EISs, system administrators frequently need to integrate data from one EIS into another EIS. In addition, system administrators may need to convert data in legacy formats to formats useable by an EIS. Finally, system administrators may need to convert EIS data into formats compatible with legacy applications. To solve these problems, various vendors provide specialized adapters and brokers to process data in one format and modify the data for use by another application in a second format. Many adapters have been written that process very specific data formats and convert them to a second specific format. However, the adapters available today do not handle arbitrary variations from a standardized format.

From the foregoing discussion, it should be apparent that a need exists for an apparatus, system, and method that handle data formats having arbitrary variations from a standardized format. Beneficially, such an apparatus, system, and method would allow users and system administrators to modify existing applications without having to modify intermediate adapters.

SUMMARY OF THE INVENTION

The present invention has been developed in response to the present state of the art, and in particular, in response to the problems and needs in the art that have not yet been fully solved by currently available apparatuses, systems, and methods for setting/retrieving header information dynamically into/from service data objects for protocol based technology adapters. Accordingly, the present invention has been developed to provide an apparatus, system, and method for setting/retrieving header information dynamically into/from service data objects for protocol based technology adapters that overcome many or all of the above-discussed shortcomings in the art.

The apparatus to accomplish setting/retrieving header information dynamically into/from service data objects for protocol based technology adapters is provided with a plurality of modules configured to functionally execute the necessary steps to set/retrieve header information dynamically into/from service data objects for protocol based technology adapters. These modules in the described embodiments include a wrapper module, a storage module, a parsing module, a receive module, a build module, and a send module.

The apparatus, in one embodiment, is a computer program product for processing technology specific messages. The computer program product is configured to receive a message having a conventional header and a user-defined header that both conform to a predefined header format, each header comprising a header name and a value. The computer program product is further configured to identify each header in the message based on the predefined header format; generate a header structure to store the header name and the value from each header; store the header structure in a set of header structures of an extendable message business object; and pass the extendable message business object to an integration broker.

In a further embodiment, the computer program product is configured such that the header name of the header structure comprises metadata defining an arbitrary header field in the extendable message business object.

In a further embodiment, the computer program product is configured such that the header structure is a header business object and the set of header structures of an extendable message business object is a set of business header objects of an extendable message business object.

In a further embodiment, the computer program product is configured such that each header business object comprises a header name attribute holding the header name and a header value attribute holding the value.

In a further embodiment, the computer program product is further configured to communicate the user-defined headers to a destination EIS that processes the user-defined headers.

In a further embodiment, the computer program product is configured such that the message is an email message.

In a further embodiment, the computer program product is further configured such that a conventional header comprises non-user-defined headers defined in RFC822 (Request For Comments #822) and a user-defined header comprises a user-defined header defined in RFC822 and the pre-defined header format comprises a format for conventional and user-defined headers as defined in RFC822.

In a further embodiment, the computer program product is further configured such that the user-defined header is defined by a developer of an EIS.

In a further embodiment, the computer program product is further configured such that the user-defined header is defined by a software tool in response to a user request.

In a further embodiment, the computer program product is further configured such that the user-defined header is defined by a developer of a web developer.

In a further embodiment, the computer program product is further configured such that the message is an FTP (File Transfer Protocol) conversation message.

In a further embodiment, the computer program product is configured to receive an extendable message business object from an integration broker, wherein the extendable message business object comprises a set of header structures, each header structure comprising a header name and a value; extract the set of header structures from the extendable message business object; generate a message comprising a conventional header and a user-defined header that both conform to a predefined header format, each user-defined header comprising a header name and a value.

In a further embodiment, the computer program product is further configured such that the header name of the header structure comprises metadata defining an arbitrary header field in the extendable message business object.

In a further embodiment, the computer program product is further configured such that the header structure is a header business object and the set of header structures of an extendable message business object is a set of business header objects of an extendable message business object.

A system of the present invention is also presented to set/retrieve header information dynamically into/from service data objects for protocol based technology adapters. The system may be embodied by various modules and devices. In particular, the system, in one embodiment, includes an integration broker comprising a mapping module configured to map between an extendable message business object for an email adapter and an EIS (Enterprise Information System) specific business object usable by an EIS specific adapter; an EIS specific adapter in communication with the integration broker, the EIS specific adapter configured to map between an EIS record and an EIS specific business object; and an integration email adapter in communication with the integration broker and configured to receive an email message from a mail transfer agent having a conventional header and a user-defined header that both conform to a predefined header format, each user-defined header comprising a header name and a value. The integration email adapter may further be configured to identify each header in the email message based on the predefined header format; to generate a header structure to store the header name and the value from each header; to store the header structure in a set of header structures of an extendable message business object; and to pass the extendable message business object to the integration broker.

A method of the present invention is also presented for processing an email message. The method in the disclosed embodiments substantially includes the steps necessary to carry out the functions presented above with respect to the operation of the described computer program product and system. In one embodiment, the method includes receiving a message having a conventional header and a user-defined header that both conform to a predefined header format, each user-defined header comprising a header name and a value; identifying each header in the message based on the predefined header format; generating a header structure to store the header name and the value from each header; storing the header structure in a set of header structures of an extendable message business object; and passing the extendable message business object to an integration broker.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
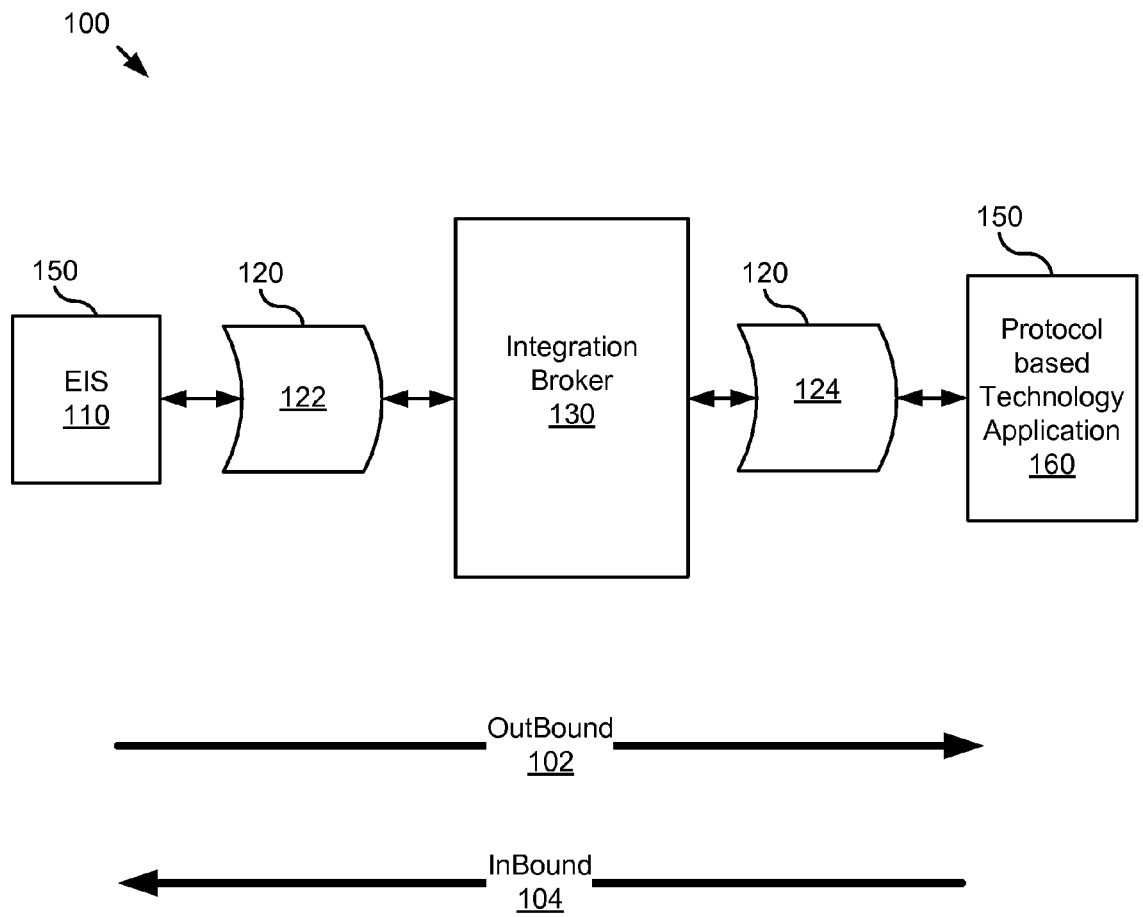
FIG. 1 is a schematic block diagram illustrating one embodiment of a system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer program of a computer useable storage medium and useable by a computer as part of a computer program product program may take any form capable of generating a signal, causing a signal to be generated, or causing execution of a program of machine-readable instructions on a digital processing apparatus. A computer readable medium may be embodied by random access memory, read only memory, flash memory, a transmission line, a compact disk, digital-video disk, a magnetic tape, a Bernoulli drive, a magnetic disk, a punch card, integrated circuits, custom VLSI circuits, gate arrays, or other digital processing apparatus memory devices, or other devices capable of directing, modifying, or otherwise providing input to the processing of a digital processing apparatus. A computer usable storage medium may take any form capable of storing data for a computer, such as flash memory, RAM, ROM, CD, or other media.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts one embodiment of a system 100 for setting/retrieving header information dynamically into/from service data objects for protocol based technology adapters. The illustrated system 100 comprises one or more applications 150 in communication with each other through an integration broker 130. The system 100 may further comprise one or more adapters 120 that support communication between an application 150 and the integration broker 130.

In the illustrated embodiment, one of the applications 150 is an enterprise information system (EIS) 110. An EIS 110 may comprise a database along with various interface programs and business logic. The EIS 110 may operate to store, monitor, and regulate the flow of data in an enterprise. The system 100 may facilitate the flow of data from one EIS 110 to another EIS 110. Examples of EISs 110 include a PeopleSoft® based EIS, an Oracle® based EIS, and a Siebel® based EIS.

The integration broker 130 is a system that acts as an intermediary between two or more applications 150. An integration broker 130 may integrate data among heterogeneous applications 150. In FIG. 1, an integration broker 130 acts as an intermediary between an EIS 110 and a protocol based technology application 160. The application 150 may transform data from a format usable by EIS 110 to a format usable by technology application 160. IBM Websphere Process Server is an example of an integration broker 130.

A protocol based technology application 160 may communicate data from an EIS 110 and an integration broker 130 over a specific protocol. For example, a mail transfer agent, such as sendmail, receives SMTP (simple mail transport protocol) requests from SMTP clients and communicates those requests to destination SMTP servers. In this example, SMTP is the protocol upon which the protocol based technology application 160 is based. The SMTP protocol provides for header fields according to RFC822 to be inserted at the front of each message. Other examples of technology applications 160 include an IMAP (Internet Message Access Protocol) client, a POP (post office protocol) client, an FTP (File Transport Protocol) client, an FTP server, an SSH (secure shell) client or server, an HTTP (Hyper Text Transfer Protocol) client or server, and so forth.

In one embodiment of the present invention, the technology adapter 124 receives a protocol based message from the technology application 160 and converts the message into an application specific business object usable by the integration broker 130. The message from the technology adapter 124 may comprise various header pieces, such as a "To:" header field in an email message, which the technology adapter 124 dynamically integrates into a business object that the technology adapter 124 sends to the integration broker 130. The technology adapter 124 dynamically interprets header fields received from the technology application 160 and builds those header fields into a message to the integration broker 130 that the integration broker 130 may not need to understand or interpret. The technology adapter 124 may not interpret the individual header fields either. The technology adapter 124 dynamically processes and communicates the header fields to the integration broker 130 and eventually to the application specific adapter 122 and in some instances to the EIS 110.

The process may also work in reverse. The EIS 110 may create a message comprising header fields destined for a technology application 160. The technology adapter 124 and the technology application 160 need not directly interpret the message header fields, but may dynamically create messages with the header fields for communication to the technology application 160 and eventually to a destination application (not shown) and a destination EIS (not shown). For purposes of this specification, messages sent from an EIS 110 to a technology application 160 are termed outbound 102 messages. Messages originating from a technology application 160 and destined for an EIS 110 are termed inbound 104 messages.

Figure 2:
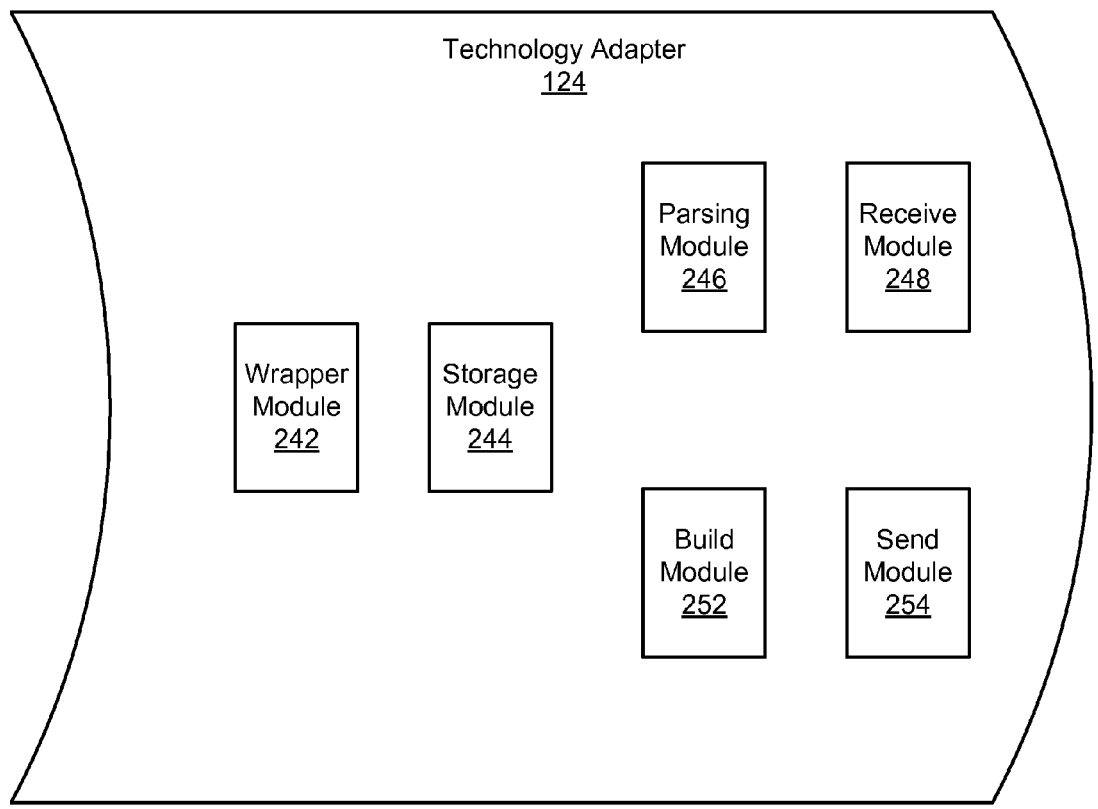
FIG. 2 is a schematic block diagram illustrating one embodiment of a technology adapter in accordance with the present invention.

FIG. 2 depicts a protocol based technology adapter 124. As illustrated in FIG. 1, a technology adapter 124 may communicate with an integration broker 130 and a technology application 160. The technology adapter 124 converts protocol based messages into service data objects (SDOs). For example, a technology adapter 124 may receive an SMTP email message and convert it to an email service data object. The integration broker 130 acts as an intermediary between a protocol based messaging environment to a service data object messaging environment. Protocol based messages may be used by legacy applications that use legacy protocols to communicate over networks such as the Internet. Service Data Objects (SDOs) are used by Service Oriented Architecture (SOA) systems to convey data and actions from one SOA component to another.

The protocol based technology adapter 124 comprises a wrapper module 242, a storage module 244, a parsing module 246, a receive module 248, a build module 252, and a send module 254. The wrapper module 242, the storage module 244, the parsing module 246, and the receive module 248 handle outbound 102 messages while the send module 254, the build module 252, the storage module 244, and the wrapper module 242 handle inbound 104 messages.

INBOUND MESSAGES: The receive module 248 receives inbound 104 protocol based messages. The receive module 248 handles protocol communications and protocol handshakes necessary to communicate with the technology application 160. For example, an email technology adapter 124 may handle POP (post office protocol) and IMAP (Internet Message Access Protocol) to communicate with an email technology application 160. Similarly, an FTP technology adapter 124 may handle protocol level FTP communication. In some embodiments, a single technology adapter 124 handles only one protocol. However, in alternative embodiments, a technology adapter 124 may handle multiple protocols.

The parsing module 246 may receive a text based message from the receive module 248 and parse the message. In an email technology adapter 124, the parsing module 246 may parse the message according to the rules defined in RFC822. The technology adapter 124 may extract the headers from the message according to the RFC822 specification. RFC822 defines email message headers. RFC822 specifically lists the following conventional header fields: Return-path, Received, Reply-to, From, Sender, Resent-Reply-To, Resent-From, Resent-Sender, Resent-From, Date, Resent-Date, To, Resent-To, cc, Resent-cc, bcc, Resent-bcc, Message-ID, Resent-Message-ID, In-Reply-To, References, Keywords, Subject, Comments, and Encrypted. Each of these listed header fields is supported under RFC822.

In addition to the listed header fields, RFC822 provides for user-defined-fields. Many vendors of email servers have added specific and/or proprietary user-defined header fields. For example, some email servers add an "X-Nonspam" field which specifies the statistical probability that the flagged email is spam. Many vendors create user-defined headers. Some are widely recognized while others are recognized only by one vendor's email servers. An email server vendor may add a header to tag specific information in an email for special processing. In one embodiment of an email technology adapter 124, a parsing module 246 follows the RFC822 rules to parse all header fields. Conventional header fields and user-defined header fields are parsed and extracted from the email message and passed to the storage module 244. In another embodiment, the parsing module 246 parses FTP protocol messages and extracts header messages from the FTP messages according to a header format.

The storage module 244 stores each parsed header field. The storage module 244 may store header fields as entries in a hash map storage object, as a linked list, or as another storage object. In some embodiments, a hash map storage object is preferred over a linked list. A hash map may provide a self-contained data structure that is easily passed from one module to another. Also, a hash map provides quick insertion, retrieval, and sorting functionality not available in a standard linked list. Of course, one of skill in the art could construct a storage object based on linked-list technology or other storage pooling that would provide a self-contained data structure that is easily passed from one module to another and provides efficient and quick insertion, retrieval, and sorting functionality. Such as storage object is also considered within the scope of the present invention.

In one embodiment, each header field comprises a header name and a value. For example, according to RFC822, the destination of an email message may be specified in a "To" header field. "To" represents the header name, and a series of one or more email addresses represents the value of the header field. The storage module 244 may store the header name and value in a hash map keyed by the header name.

The wrapper module 242 builds a wrapper service data object. In the email example, wrapper module 242 builds an email wrapper service data object. The wrapper module 242 constructs a header business object for each header name and value stored by the storage module 244. The wrapper module 242 associates each header business object with the email wrapper service data object. The wrapper module 242 may also associate file attachments of the email message to the email wrapper service data object. Similarly, the wrapper module 242 may associate business objects received with the email message as business object attachments to the email wrapper service data object.

In an alternative embodiment, the wrapper module 242 may build a wrapper service data object comprising the storage object created by the storage module 244. For example, the storage module 244 may store header fields in a java hash map and the wrapper module 242 may build a wrapper service data object comprising the hash map created by the storage module 244. In this embodiment, the integration broker 130 may be configured to process header fields directly from a hash map.

OUTBOUND MESSAGES: For outbound 102 messages, the wrapper module 242 receives outbound 102 service data objects, for example wrapper service data objects. The wrapper service data object may comprise file attachments, business object attachments, and one or more header business objects. File attachments may comprise text files, word processor files, image files such as JPEG files, and the like. File attachments are passed as a set of attachments associated with the wrapper service data object.

The wrapper module 242 passes header business objects from the outbound wrapper service data object to the storage module 244 for storage in a temporary storage object such as a hash map. The build module 252 creates a protocol message such as an email message. In the case of emails, the email message may comprise the header business objects transformed into RFC822 compliant conventional and user-defined headers. The build module 252 also associates file attachments and business objects from the wrapper service data object with the new outbound message. The send module 254 transmits the new message using an appropriate protocol. In the case of an email the message, the send module 254 may use SMTP to transmit the email message to a technology application 160 such as a sendmail server or other mail transfer agent.

Figure 3:
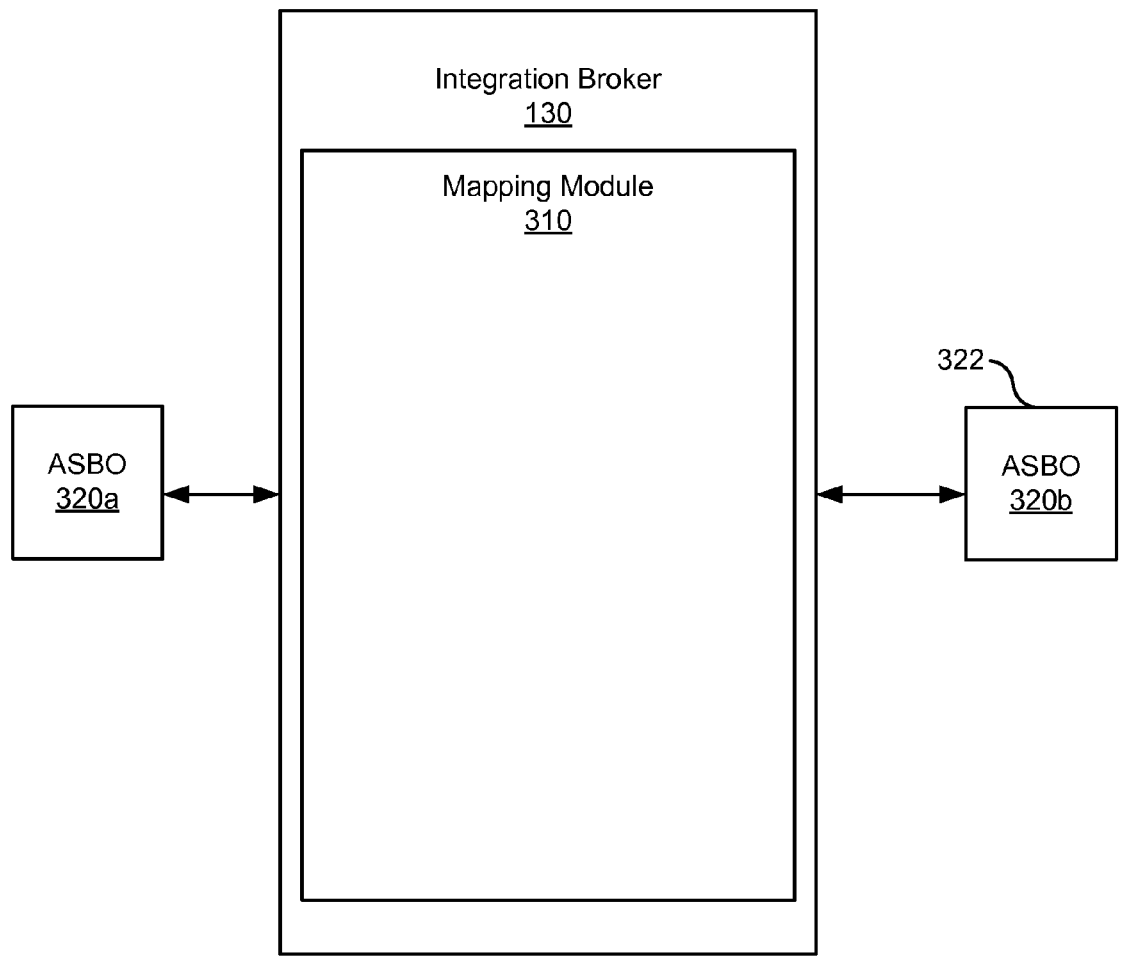
FIG. 3 is a schematic block diagram illustrating one embodiment of a integration broker in accordance with the present invention.

FIG. 3 depicts an integration broker 130. The integration broker 130 may comprise a mapping module 310. As described with respect to FIG. 1, the integration broker 130 communicates with applications 150 via adapters 120. The integration broker 130 may receive an application specific business object (ASBO) 320 from one application 150. The integration broker 130 may transform the ASBO 320a from a format usable by one application 150 into an ASBO 320b specific format for use by another application 150. For example, the integration broker may receive an ASBO 320a from an EIS 110. The mapping module 310 may then transform the ASBO 320a into an email wrapper business object (EMBO) 322, described further below.

The integration broker 130 may use routing information extracted from an ASBO 320 to determine the type of application 150 to which a ASBO 320 should be directed and thus determine the type of transformation necessary to transform an ASBO 320a from a format usable by one application 150 to a format usable by a destination application 150.

The mapping module 310 effects the actual transformation of an ASBO 320a to an ASBO 320b. The mapping module 310 may directly transform an ASBO 320 for use by one application 150 into a form usable by a destination application 150. Alternatively, the mapping module 310 may transform the ASBO 320 into a generic business object and subsequently transform the generic business object into an ASBO 320 for use by a destination application 150. For purposes of this application, an ASBO 320 and all top-level business objects may be service data objects.

As described above, in an alternative embodiment, the ASBO 320b may comprise a service data object that contains a hash map. The mapping module 310 may process the ASBO 320b, extracting header fields from a hash map contained within the ASBO 320b. The mapping module 310 may further map the header fields into a ASBO 320b, understandable to a EIS 110. Similarly, the mapping module 310 may transform an outbound 102 ASBO 320a into a ASBO 320b comprising a hash map that contains header fields from the ASBO 320a.

Figure 4:
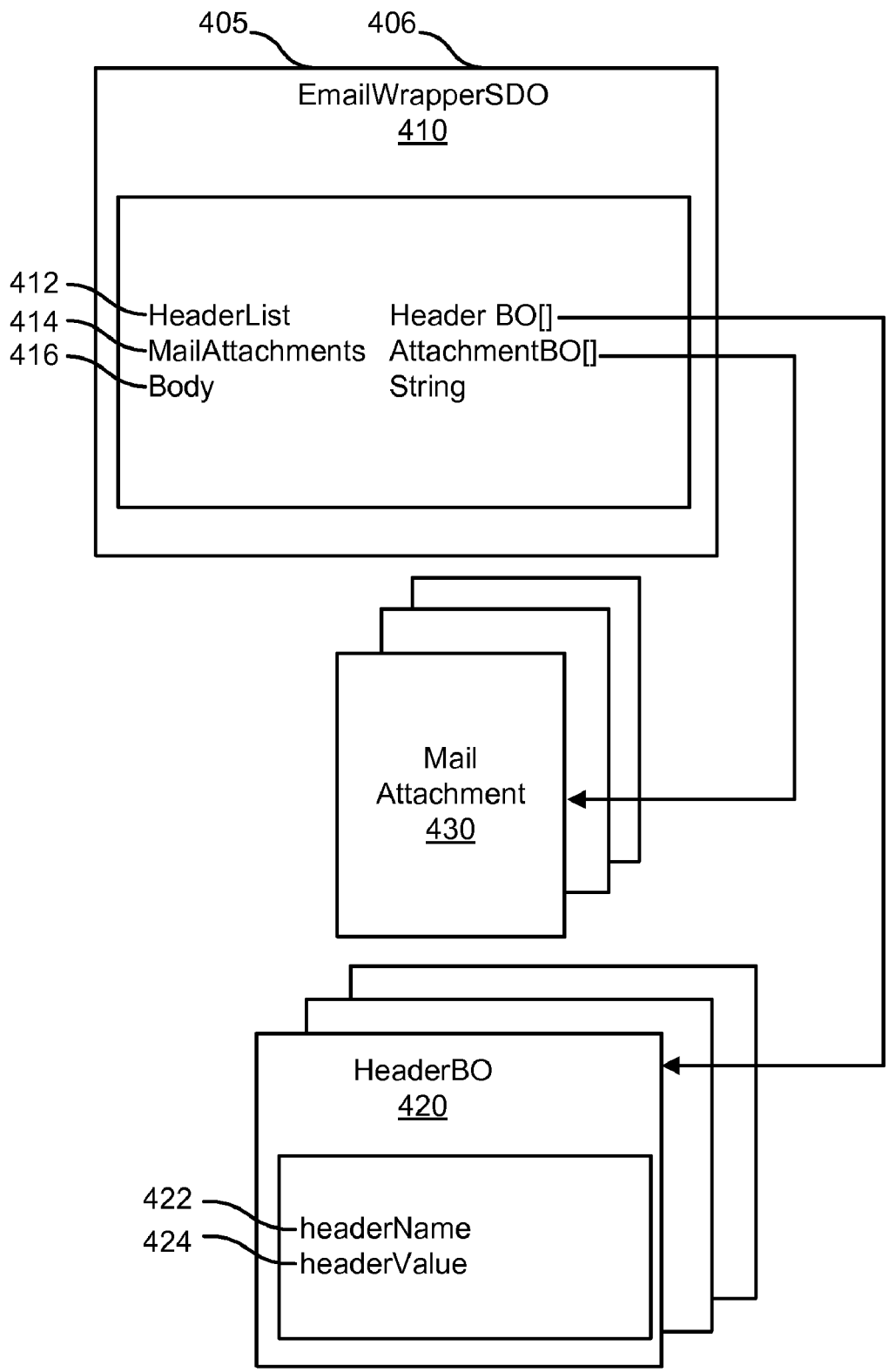
FIG. 4 is a schematic block diagram illustrating one embodiment of data structures in accordance with the present invention.

FIG. 4 depicts one embodiment of a service data object (SDO) 405. In the illustrated embodiment, the SDO 405 is an extendable message business object 406. An extendable message business object 406 is a business object or a SDO 405 that comprises a dynamic set of header business objects 420. The extendable message business object 406 is extendable in that it may contain or hold a dynamic number of header business objects 420. For example, an extendable message business object 406 may comprise a dynamic list of header business objects 420. In an alternative embodiment, an extendable message business object 406 may comprise a hash map for storing a dynamic set of header business objects 420. In one embodiment, the extendable message business object 406 is an email wrapper service data object (SDO) 410. The email wrapper SDO 410 may comprise a header list 412 of header business objects 420, various mail attachments 414, and an email body 416.

The header list 412 may comprise one or more header business objects 420. Each header business object 420 may comprise a header name 422 and a header value 424. The attachments 414 may comprise file attachments and/or business object attachments. The email body 416 may comprise text or other data. In one embodiment, the parts of a multipart MIME (multipurpose internet mail extensions) message are formatted in the email body 416. In an alternative embodiment, each MIME part comprises one mail attachment 430.

Figure 5:
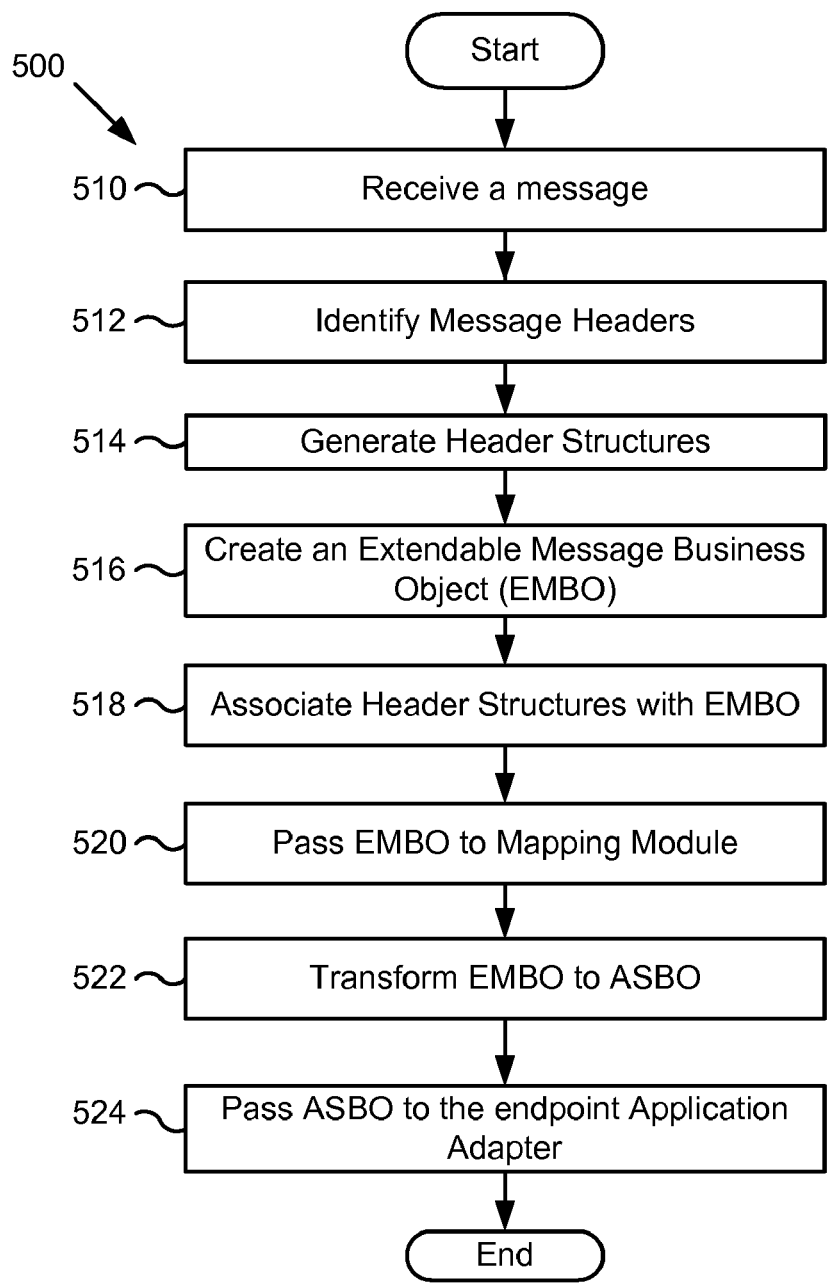
FIG. 5 is a schematic flow chart diagram illustrating one embodiment of a method in accordance with the present invention.

FIG. 5 depicts one embodiment of a method 500 for processing an inbound 104 message in accordance with the present invention. The method comprises receiving 510 a message from a technology application 160 by the receive module 248. The message may be an email message, an FTP message, or other protocol based message.

The method 500 further comprises the parsing module 246 identifying 512 header fields in the message. The parsing module 246 may parse the headers to identify a header name 422 and a header value 424. The storage module 244 may store the header name 422 and the header value 424 pairs in a temporary storage object such as a hash map.

The wrapper module 242 generates 514 header structures for each header name 422 and header value 424 pair. The header structure may be a business object such as a header business object 420. The wrapper module 242 further creates 516 an extendable message business object 406 to hold any mail attachments 430, both file attachments and business object attachments. The wrapper module 242 may further associate the body of the message with the extendable message business object 406.

The wrapper module 242 further associates 518 the header structures or header business objects 420 with the extendable message business object 406. The wrapper module 242 does not need to identify the various header business objects 420 specifically. The header business objects 420 may comprise conventional header fields or user-defined header fields. The wrapper module 242 dynamically generates 514 the header structures. In this manner, a message, for example an email message, may contain user-defined headers unknown to the technology adapter 124 or any of its modules. Regardless, the wrapper module 242 generates 514 header structures and associates 518 the header structures with the extendable message business object 406.

For example, legacy email processing adapters search for specific header fields and provide specialized processing for certain header fields. For instance, a legacy email processing adapter searches for a "To" header field and processes the "To" header field using specialized code designed specifically for the "To" field. A legacy email processing adapter may provide specialized code for a "From" field, a "Date" filed, a "cc" field and so forth. If a system administrator adds a new header field, the legacy email processing adapter may require updating to handle the new header field.

The present invention interprets each header field in the same way. The software interpreting the header fields is not specific to the header field type. In one embodiment, the technology adapter 124 of the present invention may interpret each header field as a generic header field and creates a header business object 420 from an inbound header field or converts a header business object 420 to a header field for an outbound header business object 420. In some embodiments, the present invention may provide specialized processing for one or more header fields and handle the remaining fields generically.

The technology adapter 124 passes 520 the extendable message business object (EMBO) 406 to the mapping module 310. The integration broker 130 transforms 522 the EMBO 406 to an ASBO 320 and passes 524 the ASBO 320 to an endpoint application adapter 122 which in turn passes the ASBO 320 to a destination application 150 which may be an EIS 110.

Figure 6:
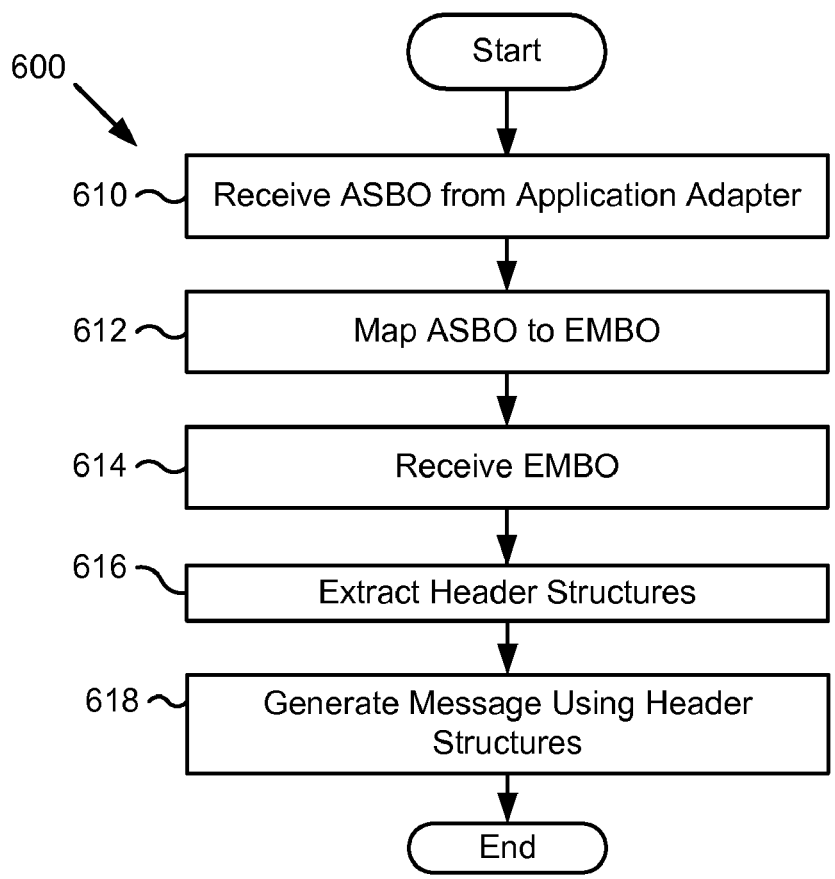
FIG. 6 is a schematic flow chart diagram illustrating one embodiment of a method in accordance with the present invention.

FIG. 6 depicts one embodiment of a method 600 for processing an outbound 102 message in accordance with the present invention. The outbound 102 processing substantially mirrors the inbound 104 processing. The outbound 102 processing may comprise receiving 610 an ASBO 320 from an application specific adapter 122; mapping 612 the ASBO 320 to an extendable message business object 406; receiving 614 the extendable message business object 406 by a wrapper module 242 of a technology adapter 124; extracting 616 header structures from the extendable message business object 406; and generating 618 a message comprising the extracted header structures and any other attachments associated with the extendable message business object 406.

The integration broker 130 receives 610 the ASBO 320. The ASBO 320 may be formatted in a way that is specific to the EIS 110 from which the ASBO 320 originated. The mapping module 310 of the integration broker 130 maps 612 the ASBO 320 to a format usable by a protocol based technology adapter 124. The wrapper module 242 of the technology adapter 124 receives 614 the extendable message business object 406 and extracts the header structures. The wrapper module 242 need not have specific processing for individual header structure types. The wrapper module 242 processes conventional and user-defined header structures in much the same way. In this manner, an EIS 110 may create a user-defined header structure and pass the header structure to the technology adapter 124. Advantageously, the technology adapter 124 software need not be modified to handle each new user-defined header structure.

The wrapper module 242 extracts 616 the header structures. The header structures may be header business objects and may comprise a header name 422 and header value 424 pair. A storage module 244 may store the header structures in a temporary storage object such as a hash map. A build module 252 generates 618 a message and associates the header structures with the new message. The send module 254 passes the message to a destination technology application 160.

In one embodiment, the header structures are business objects comprising RFC822 header name 422 and header value 424 pairs. A technology application 160 may send an email message to the technology adapter 124 that contains a user-defined header name 422. The technology adapter 124 need not have any knowledge of the user-defined header name 422. The technology adapter 124 dynamically sets header information in the inbound 104 extendable message business object 406 and dynamically sets header information in the outbound 102 extendable message business object 406. The extendable message business object 406 need not contain attributes such as "To", "Subject", and so forth. In one sense, the header name 422 portion of a header structure, for example "To," is converted to metadata while the header value 424 is stored and transmitted as data corresponding to the metadata of the header name 422.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for providing a technology adapter in a service oriented architecture (SOA) system for translating a protocol-based message having a first format into a service data object having a second format, the computer program product comprising a computer useable storage medium including a computer readable program, wherein the computer program product when executed on a computer causes the technology adapter to:
   receive a protocol-based message in the first format, the protocol-based message having a conventional header defined by the protocol and a user-defined header that is not defined by the protocol, the user-defined header comprising one or more fields that are unknown to the technology adapter and that are not interpreted by the technology adapter, and wherein both the conventional header and the user-defined header both conform to a predefined header format, each header comprising a header name and a value;
   identify each conventional header and user-defined header in the protocol-based message based on the predefined header format;
   dynamically generate a header structure to store the header name and the value from each conventional header and user-defined header;
   store the header structure in a set of header structures of a service data object having the second format; and
   pass the service data object to an integration broker.

2. The computer program product of claim 1, wherein the header name of the header structure comprises metadata defining an arbitrary header field in the service data object.

3. The computer program product of claim 1, wherein the service data object is an extendable message business object, and wherein the header structure is a header business object and the set of header structures of an extendable message business object is a set of business header objects of an extendable message business object.

4. The computer program product of claim 3, wherein each header business object comprises a header name attribute holding the header name and a header value attribute holding the value.

5. The computer program product of claim 1, configured to communicate the user-defined headers to a destination Enterprise Information System (EIS) that processes the user-defined headers.

6. The computer program product of claim 1, wherein the message is an email message.

7. The computer program product of claim 6, wherein the conventional header is a non-user-defined header as defined in RFC822 and the user-defined header is a user-defined header as defined in RFC822 and the pre-defined header format is a format for conventional and user-defined headers as defined in RFC822.

8. The computer program product of claim 7, wherein the user-defined header is defined by a developer of an EIS.

9. The computer program product of claim 7, wherein the user-defined header is defined by a software tool in response to a user request.

10. The computer program product of claim 7, wherein the user-defined header is defined by a web developer.

11. The computer program product of claim 1, wherein the message is an FTP (File Transfer Protocol) conversation message.

12. A computer program product for providing a technology adapter in a service oriented architecture (SOA) system for translating a protocol-based message having a first format into a service data object having a second format, the computer program product comprising a computer useable medium including a computer readable program, wherein the computer program product when executed on a computer causes the technology adapter to:
   receive a service data object having a second format from an integration broker, wherein the service data object comprises a set of header structures, each header structure comprising a header name and a value;
   extract the set of header structures from the service data object received from the integration broker;
   generate a protocol-based message having a first format, the protocol-based message comprising a conventional header defined by the protocol and a user-defined header that is not defined by the protocol, the user-defined header comprising one or more fields that are unknown to the technology adapter and that are not interpreted by the technology adapter, and wherein both the conventional header and the user-defined header both conform to a predefined header format, each user-defined header comprising a header name and a value.

13. The computer program product of claim 12, wherein the header name of the header structure comprises metadata defining an arbitrary header field in the service data object.

14. The computer program product of claim 12, wherein the header structure is a header business object and the set of header structures of a service data object is a set of business header objects of an extendable message business object.

15. The computer program product of claim 12, configured to communicate the user-defined headers to a destination Enterprise Information System (EIS) that processes the user-defined headers.

16. The computer program product of claim 12, wherein the message is an email message.

17. The computer program product of claim 16, wherein the conventional header is a non-user-defined header as defined in RFC822 and the user-defined header is a user-defined header as defined in RFC822 and the pre-defined header format is a format for conventional and user-defined headers as defined in RFC822.

18. The computer program product of claim 17, wherein the user-defined header is defined by a developer of an EIS.

19. The computer program product of claim 17, wherein the user-defined header is defined by a software tool in response to a user request.

20. The computer program product of claim 17, wherein the user-defined header is defined by a developer of a component compatible with the SOA system.

21. The computer program product of claim 12, wherein the message is an FTP (File Transfer Protocol) conversation message.

22. The computer program product of claim 13, wherein the service data object is an extendable message business object that comprises information from a record in a source EIS.

23. The computer program product of claim 14, wherein each header business object comprises a header name attribute holding the header name and a header value attribute holding the value.

24. A service oriented architecture (SOA) system for processing an email message using a technology adapter, wherein processing the email message comprises translating the email message into a service data object having a second format, the system comprising:
an integration broker comprising a mapping module configured to map between an extendable message business object for an email adapter and an EIS (Enterprise Information System) specific business object usable by an EIS specific adapter, wherein the extendable message business object is a service data object;
an EIS specific adapter in communication with the integration broker, the EIS specific adapter configured to map between an EIS record and an EIS specific business object; and
an integration email adapter in communication with the integration broker and configured to receive an email message from a mail transfer agent, the email message having a conventional header and a user-defined header that both conform to a predefined header format, the user-defined header comprising one or more fields that are unknown to the technology adapter and that are not interpreted by the technology adapter, each user-defined header comprising a header name and a value, the integration email adapter further configured:
to identify each conventional header and user-defined header in the email message based on the predefined header format;
to dynamically generate a header structure to store the header name and the value from each conventional header and user-defined header;
to store the header structure in a set of header structures of an extendable message business object; and
to pass the extendable message business object to the integration broker.

25. A method of providing a technology adapter service to process an email message in a service oriented architecture (SOA) system, the method comprising:
receiving a protocol-based message in a first format, the protocol-based message having a conventional header defined by the protocol and a user-defined header that is not defined by the protocol, the user-defined header comprising one or more fields that are unknown to the technology adapter and that are not interpreted by the technology adapter, and wherein both the conventional header and the user-defined header both conform to a predefined header format, each user-defined header comprising a header name and a value;
identifying each conventional header and user-defined header in the protocol-based message based on the pre-defined header format;
dynamically generating a header structure to store the header name and the value from each conventional header and user-defined header;
storing the header structure in a set of header structures of a service data object having a second format; and
passing the service data object to an integration broker.

26. A computer program product for providing a technology adapter in a service oriented architecture (SOA) system for dynamically setting header information in service data objects comprising a computer useable storage medium including a computer readable program, wherein the computer program product when executed on a computer causes the technology adapter to:
parse an email message having RFC822 compliant header fields that are supported under the RFC822 standard and a message body wherein at least one RFC822 header field is a conventional header specified in RFC822 and as least one RFC822 header field is a user-defined header field according to RFC822, which user-defined header field comprises one or more fields that are unknown to the technology adapter and that are not interpreted by the technology adapter;
for each RFC822 header field, create a storage object comprising a field-name from the RFC822 header field and a field-body from the RFC822 header field;
dynamically construct an email wrapper business object comprising the body of the email message;
for each storage object, create a header business object having a header name equivalent to the field-name and a header value equivalent to the field-body and associate each header business object with the email wrapper business object;
map the email wrapper business object to an application specific business object; and
send the application specific business object to an application,
wherein mapping the email wrapper business object transforms the email wrapper business object, including the user-defined field, for use by the application, and
wherein the user-defined header field is an arbitrary header field.

27. The computer program product of claim 26, wherein the user-defined header is defined by a developer of an Enterprise Information System (EIS).

28. The computer program product of claim 26, wherein the user-defined header is defined by a software tool in response to a user request.

29. A method for deploying computing infrastructure in a service oriented architecture (SOA) system comprising a technology adapter, the method comprising:

receiving customer requirements for transfer of a user-defined header from a mail transfer agent to a destination Enterprise Information System (EIS);

deploying an integration email adapter into the customer computing infrastructure, the integration email adapter configured to receive an email message from the mail transfer agent, the email message having a conventional header defined by a protocol and a user-defined header that is not defined by the protocol, the user-defined header comprising one or more fields that are unknown to the technology adapter and that are not interpreted by the technology adapter, and wherein the conventional header and the user-defined header both conform to a predefined header format, each user-defined header comprising a header name and a value, the integration email adapter further configured:

to identify each conventional header and user-defined header in the email message based on the predefined header format;

to dynamically generate a header structure to store the header name and the value from each conventional header and user-defined header;

to store the header structure in a set of header structures of service data object having a second format; and to pass the service data object to an integration broker; and configuring the destination EIS to extract the user-defined header from the service data object for use by the destination EIS.

30. The method of claim 29, wherein the header structure is a header business object and the set of header structures of a service data object that is an extendable message business object is a set of business header objects of an extendable message business object.

31. The method of claim 30, wherein each header business object comprises a header name attribute holding the header name and a header value attribute holding the value.

32. The method of claim 29, wherein the conventional header is a non-user-defined header as defined in RFC822 and the user-defined header is a user-defined header as defined in RFC822 and the pre-defined header format is a format for conventional and user-defined headers as defined in RFC822.

33. The method of claim 32, wherein the user-defined header is defined by a developer of an EIS.

34. The method of claim 32, wherein the user-defined header is defined by a software tool in response to a user request.

35. The method of claim 33, wherein the user-defined header is defined by an application integration developer.

* * * * *